United States Patent
Phelps

[11] 3,785,121
[45] Jan. 15, 1974

[54] COMBINATION GAS STRIPPER AND COOLING TOWER

[76] Inventor: Peter M. Phelps, 15 Buckeye Way, Kentfield, Calif. 94904

[22] Filed: Mar. 27, 1972

[21] Appl. No.: 238,307

[52] U.S. Cl............... 55/53, 55/70, 55/186, 55/196, 261/149, 261/151
[51] Int. Cl............................................ B01d 19/00
[58] Field of Search ............. 55/42, 44, 53, 70, 55/184–200; 261/149, 151

[56] References Cited
UNITED STATES PATENTS

| | | | |
|---|---|---|---|
| 3,594,987 | 7/1971 | Oda et al. | 55/53 |
| 2,747,847 | 5/1956 | Otto | 261/151 X |
| 3,404,072 | 10/1968 | Bollen et al. | 55/70 X |
| 3,428,426 | 2/1969 | Carney et al. | 55/70 X |
| 3,540,189 | 11/1970 | Siewers et al. | 55/70 X |
| 3,626,672 | 12/1971 | Burbidge | 55/185 |
| 3,733,777 | 5/1973 | Huntington | 55/185 X |

Primary Examiner—Samih N. Zaharna
Assistant Examiner—Richard W. Burks
Attorney—Flehr, Hohbach, Test, Albritton & Herbert

[57] ABSTRACT

A method and apparatus for simultaneously stripping a liquid stream contaminated with a dissolved gas impurity in a stripping section and cooling a fluid (liquid or gas) in a fluid cooling section. The stripping efficiency is increased by supplying an air stream for stripping which has been warmed by heat transfer with the cooled fluid in the fluid cooling section. In one embodiment, one or more fluid cooling sections of a crossflow type are disposed below and to the sides of an upright stripping section so that a fan can draw air sequentially through both sections. In another embodiment, fluid cooling sections of crossflow type are disposed at the sides of the stripping section at the same elevation. For economy, the cooled fluid exiting from the liquid cooling section may be directed past a heat generating source for cooling the same and thereafter recycling to the fluid cooling zone.

13 Claims, 2 Drawing Figures

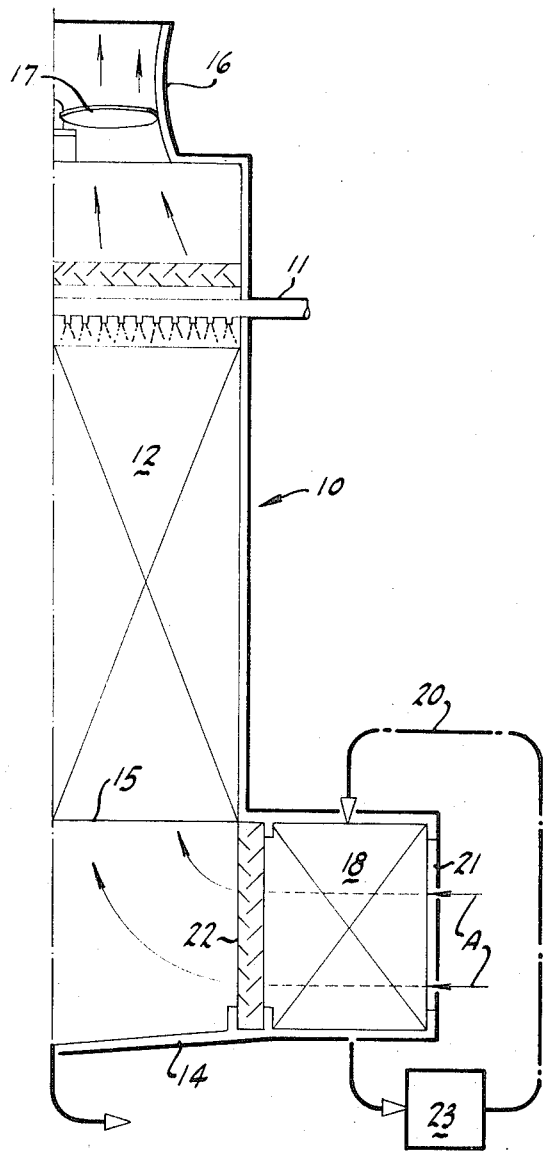
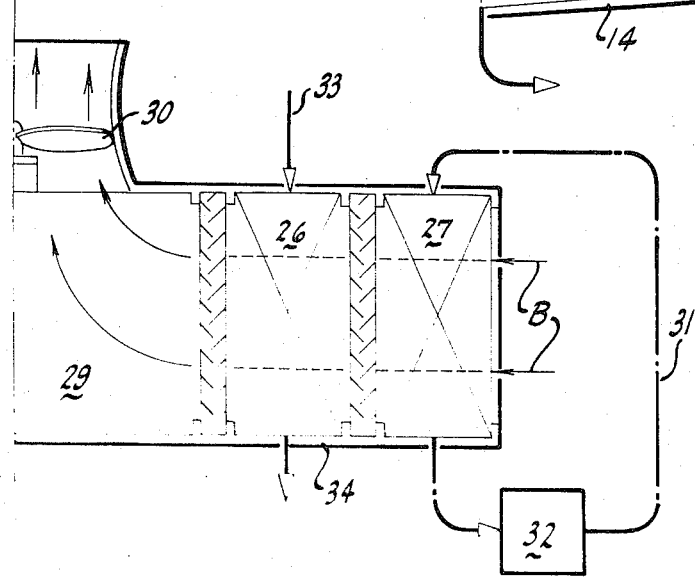

COMBINATION GAS STRIPPER AND COOLING TOWER

BACKGROUND OF THE INVENTION

It is conventional to remove dissolved gas contaminants (e.g., ammonia) from a contaminated liquid stream (e.g. waste water) in a stripping column by contact of the liquid stream with a gas stream, typically air. It is known that the solubility of the ammonia contained in the waste water is inversely dependent upon the stripping temperature. It is further known that a certain portion of the liquid evaporates in the stripping column with a spontaneous cooling effect on the remaining liquid. This cooling of the waste water results in a reduction of the gas stripping efficiency by the air.

One attempt to provide the requisite degree of stripping is to increase the rate of air flow per unit volume of liquid. This leads not only to increased fan power requirements, but also to a further cooling of the water which, in turn, again lowers the efficiency of stripping.

SUMMARY OF THE INVENTION AND OBJECTS

It is a general object of the invention to provide a highly efficient stripping system which overcomes the aforementioned disadvantages of the prior art.

It is a particular object of the invention to provide a stripping system of the aforementioned type which accomplishes cooling of a separate fluid stream which may be used as a coolant in a heat exchanger or the like.

It is a further object of the invention to employ a heated air stream in an industrial environment which would be normally vented to the atmosphere for the purpose of increasing the efficiency of the above stripping column.

Other and further objects of the invention will be apparent from the following description taken in conjunction with the accompanying drawing.

In accordance with the above objects, a fluid cooling section has been combined with a gas stripping apparatus (a) to produce increased stripping efficiency and (b) to cool a quantity of fluid (gas or liquid) as for use in a heat exchanger or the like. An air stream and a substantially warmer fluid to be cooled are supplied to a fluid cooling section in which the air is warmed by the fluid which, in turn, is cooled by the air. Thereafter, the warmed air stream and a liquid stream contaminated with a dissolved gas impurity are directed to a stripping zone in which the gas impurity is removed in the air stream from the contaminated liquid. The gas impurity may be a conventional one, such as ammonia, which is characterized by a solubility in the contaminated liquid which is inversely dependent upon the stripping temperature.

In one form of the invention, a portion of the cooled fluid exiting the cooling zone is directed to a heat exchanger in which it is warmed by heat transfer from a conventional heat generating source. The warmed fluid is thereafter recycled to the fluid cooling zone. Where the fluid and contaminated liquid streams are formed of water, a portion of the latter stream may be supplied as a make-up liquid to the recycled former stream.

In order to carry out the foregoing process, an apparatus is provided in which the gas outlet from the cooling section is in communication with and proximate to the gas inlet for the stripping column. The fluid cooling section is of either a crossflow or counterflow type with a gas outlet opening disposed to the side of the stripping tower gas inlet opening with a generally unobstructed gas path therebetween. In this manner, a single fan means disposed above the stripping column serves to draw air through both it and the fluid cooling section with a minimum power requirement.

BRIEF DESCRIPTION OF THE DRAWING

FIGS. 1 and 2 are schematic representations of different embodiments according to the present invention.

DETAILED DESCRIPTION OF THE PREFERRED EMBODIMENTS

Referring to FIG. 1, the portion not shown, to the left of the center line, is identical to the illustrated portion. A stripping column 10 is illustrated to which a liquid stream, such as waste water, contaminated with a dissolved gas impurity is sprayed or otherwise supplied to pass downwardly from liquid supply means such as headers 11 with suitable nozzles. Alternatively, distribution troughs, not shown, may be employed. A packing section 12, suitably filled with conventional packing such as tubes, rings, or corrugated sheets, is of a splash or film surface type. The packing section rests on an open deck 15 which permits the gravitation of stripped liquid into basin 14 and also a relatively unobstructed flow of air upwardly through the column.

Conventional drift eliminators are positioned above headers 11. A collection basin 14 is disposed below the bottom of the column to receive the stripped liquid after gravitation through the stripping column. For purposes of the present discussion, the liquid stream to be stripped is designated as the "contaminated liquid".

A conventional stack 16 is secured to the top wall of stripping column 10 to provide an outlet for exiting air. A fan 17 is positioned within stack 16 and is adapted to be operably coupled to a suitable source of power for actuation to withdraw air upwardly out of the column. As will be described hereinafter, fan 17 also serves to draw air through fluid cooling sections below and to the sides of stripping column 10.

Referring again to FIG. 1, fluid cooling section 18 is disposed to the side of and below packing section 12. A fluid to be cooled in line 20 is supplied to the top of section 18 by suitable distribution means, not shown, as of the same type described with respect to stripping column 10. For purposes of the present invention, the term "fluid" will designate either a liquid (e.g., employed as a coolant for a heat generating source in a heat exchanger) or a gas (e.g., a product to be condensed or cooled for collection or further processing). Section 18 includes outer wall 21 to provide an essentially horizontal inlet opening for air and inner wall 22 provides a corresponding essentially horizontal outlet opening for air. Conventional drift eliminators may be disposed along inner walls 22 to permit the free ingress and egress of air while preventing substantial movement of gravitating contaminated liquid from tower 10 into fluid cooling section 18. Air is drawn horizontally through fluid cooling section 18 and redirected upwardly into stripping section 12 by the suction created by fan 17 generally along path A.

The illustrated fluid cooling section is of the crossflow type. One advantage of a crossflow cooling section in the present invention is the relatively small amount of fan power requirements necessary to draw the air through both the cooling section and the stripping column 10. It should be understood that there may be certain highly specific circumstances in which the cooling section 18 may be of the counterflow type.

When liquid, such as water, is employed as the fluid to be cooled in cooling section 18, there is a major advantage to directly contact the air and water, namely the cooling of the water is assisted by an evaporative cooling effect. Conventional packing, such as spaced slats supported on stringers, may be employed within the cooling section for direct air-liquid contact. A particularly effective form of packing is fully described in my copending application, Ser. No. 32,995 filed Apr. 29, 1970.

Fluid cooling section 18 may also be of the tube type in which a conduit with high heat conductivity (e.g., aluminum) is disposed transverse to the direction of air flow. The cooling is accomplished by the heat from the warmer fluid 20 being transmitted through the conduit and absorbed by the air stream as it flows past. Selection of this type of fluid cooling section or the one in which there is direct liquid air contact is dependent upon the requirements of a particular system.

After cooling in section 18, the fluid in line 20 may be recycled. Along this path, the fluid is suitably directed to another portion of the plant from that in which the present apparatus is installed and through an associated heat exchanger 23 which serves to transfer heat to the fluid flowing in the conduit. The source of heat for heat exchanger 23 may be conventional equipment which generates heat during normal operation.

For purposes of the following discussion, waste water is designated as the contaminated liquid supplied through header 11 and ammonia is selected as the dissolved gas impurity. In general, the apparatus of FIG. 1 operates as follows. The waste water is sprayed through the nozzles in header 11 for distribution onto the packing in stripping section 12 wherein the water is spread out into droplets or thin films. In the stripping section, countercurrently flowing air is drawn upwardly by fan 17 to strip ammonia from the waste water. The stripped waste water is collected in basin 14 for discharge or further processing.

For increased stripping efficiency, as described more fully hereinafter, the air which is employed for stripping in column 10 is first warmed in fluid cooling section 18 by heat exchange with crossflowing fluid in line 20, cooling water for the present discussion. The air is drawn along path A through section 18 and then upwardly through packing 12 by fan 17. The cooling water exiting from the cooling sction 18 is directed through heat exchanger 23 where it is warmed while serving as a coolant for the heat exchanger. The warmed water is then recycled to the liquid cooling section 18 to warm the air flowing along a path generally denoted by arrow A.

The primary reason for combining stripping column 10 with fluid cooling section 18 is that the stripping efficiency is substantially increased at higher air temperatures. For example, it has been found that the minimum amount of air required to strip 90 percent of the ammonia from water in a stripping column is over 300 cubic feet per gallon of water at a temperature of 10°C. In contrast, if the temperature is raised to 30°C, the same 90 percent efficiency can be accomplished with a minimum of 130 cubic feet of air per gallon of water. The theoretical basis for this increased efficiency at higher temperatures is that the solubility of the ammonia in the waste water decreases with increasing temperature.

It is noted that ammonia stripping is normally accomplished at a basic pH value of at least 10. With a contaminated liquid, such as waste water, it may be desirable to adjust the pH to a basic value as by the addition of lime or another base prior to stripping.

The relative size and capacities of the stripping column and the cooling section may be varied depending upon the needs of the facility in which the apparatus is employed. For example, where the primary objective is the stripping of the contaminated liquid, a stripping column 12 would be relatively large in comparison to the cooling sections. On the other hand, it may be necessary to supply large quantities of liquid to the heat exchanger, as to cool massive equipment, in comparison to the quantity of contaminated liquid to be stripped. In this instance, the cooling sections would be relatively large in comparison to the stripping column. In a typical operation of this type, the ratio of cooling fluid to contaminated water could be as high as 50 or 100 to one.

In the embodiment of FIG. 1, the cooled liquid and stripped liquid streams are collected in separate basins and directed in different paths. If the two liquid streams are not totally dissimilar, it may be desirable to direct a portion of the stripped liquid stream as a make-up for the recycled liquid. This would be particularly beneficial where the cooling section 18 is of the direct air-liquid contact type which causes evaporation and loss of a certain amount of liquid.

Referring to FIG. 2, another apparatus according to the present invention is schematically illustrated in which both the stripping section 26 and fluid cooling section 27 are of the crossflow type with substantial portions of each disposed at the same elevation. The portion, not shown, to the left of the center line is identical to the illustrated portion to the right thereof. Packing may be disposed in both the stripping and cooling sections suitably of conventional crossflow type as described with respect to the packing in fluid cooling section 18 of FIG. 1. Upright conventional drift eliminators 28 may be disposed between stripping and fluid cooling sections 26 and 27, respectively, to permit the free flow of air along path B in a generally unobstructed manner while preventing gravitating liquid from passing between the sections.

A conventional stack is secured above and to the side of stripping section 18 above a plenum chamber 29 in which surrounding air being drawn horizontally through sections 26 and 27 is redirected to a vertical path, as generally denoted by arrow B, under the influence of fan 30 operably coupled to a suitable source of power for actuation.

The type and operation of fluid cooling section 27 are generally described with respect to section 18 of FIG. 1. In like manner, the fluid in line 31 is normally a liquid, such as water, for use as a coolant for heat exchanger 32. If cooling section 31 is of a tube type as described above, the fluid may be a gas or liquid. The gas may be a product gas to be condensed or cooled for collection or further processing.

The liquid 33 (e.g., waste water) contaminated with a gas impurity is supplied to the top of stripping section 26 suitably as described above. The liquid 33 is stripped, by the air crossflowing along path B, during gravitation through section 26 and is collected in a basin 34 for discharge or further processing. In typical operation, liquid 33 is maintained in a separate path from the fluid in line 31. If desired, as described above, both streams may be combined.

One advantage of a crossflow stripping column, as illustrated in FIG. 2, is the self-cleaning of the packing by the relatively fast gravitating liquid.

There are a number of additional advantages of the illustrated apparatus of the present invention. Firstly, the air inlet of the stripping section is in close proximity to the outlet of the cooling section which provides a short generally unobstructed path to air flow therebetween. With closely adjacent structures, ducts for conveying the heated air over substantial distance are eliminated. A further advantage is that only one fan is necessary to accomplish both stripping of the contaminated liquid and cooling of the fluid.

The temperatures of the fluid entering the cooling section and of the air entering the stripping column are dependent upon the requirements of the overall system and also upon the ambient air temperatures. For example, on a warm day a smaller amount of heat will be necessary to heat the entering air in the fluid cooling section to the desired temperature for efficient stripping in the stripping column. Conversely, the equipment cooling requirements for the coolant would be greater on a warm day.

For most effective stripping of ammonia from waste water, it is desirable for the air entering the stripping column to have a wet-bult temperature of at least 75°F. Thus, if the ambient wet-bulb temperature is 65°F, this would necessitate a 10° rise in temperature in the cooling section. Since the stripping efficiency substantially increases with the entering air temperature, the temperature elevation in the liquid cooling section is limited only by economic considerations. Unless the ambient temperature is extremely high, a temperature increase of at least 5° to 10°F is contemplated in section 18.

In accordance with the foregoing discussion, ammonia has been described as the gas to be stripped and waste water as the contaminated liquid. It should be understood that other gases, such as sulfur dioxide, may be stripped in the foregoing manner and that other liquids may be employed.

I claim:

1. A combination fluid cooling and gas stripping method comprising supplying an air stream and a substantially warmer fluid to a fluid cooling zone in which the air is warmed by the fluid which is cooled by the air, directing said warmed air stream and a liquid stream contaminated with a dissolved gas impurity to a stripping zone in which a portion of the gas impurity is removed in said air stream from said contaminated liquid, the solubility of said gas impurity in said contaminated liquid being inversely dependent upon the stripping temperature.

2. A method as in claim 1 in which the air supplied to the cooling zone is at an ambient temperature and is intimately contacted with said fluid in said zone.

3. A method as in claim 1 in which the gas impurity is ammonia.

4. A method as in claim 1 in which at least a portion of the fluid exiting the fluid cooling zone is directed to a heat exchange zone in which said fluid is warmed by heat transfer from a heat generating source and said warmed fluid is thereafter recycled to the fluid cooling zone.

5. A method as in claim 4 in which the fluid and contaminated liquid streams comprise essentially the same liquid and at least a portion of the last-named stream is supplied as make-up liquid to the recycling fluid.

6. A method as in claim 1 in which the temperature of the warmed air stream supplied to said stripping zone is at least 5°F above the ambient temperature.

7. In a combination fluid cooling and gas stripping apparatus, a fluid cooling section having fluid inlet and outlet openings, and air inlet and outlet openings, a packed stripping section having an upper liquid inlet opening, a lower liquid outlet opening, and air inlet and outlet openings, said fluid cooling section air outlet openings being in generally open communication with and proximate to said stripping column air inlet opening, said fluid inlet and outlet openings being different than and spaced apart from said liquid inlet and outlet openings, and barrier means for substantially preventing intermixing of fluid in said fluid cooling section with liquid in said stripping section.

8. An apparatus as in claim 7 together with fan means, in which the fluid cooling section is of a crossflow type, the stripping section is of a counterflow type and the air outlet opening of the fluid cooling section is disposed at an elevation at which air is capable of being drawn by said fan means therethrough in a path to the lower portion of the stripping section and upwardly through the same, said path being generally unobstructed to gas flow.

9. An apparatus as in claim 7 in which the fluid cooling section includes a fluid conduit with high heat conductivity and disposed transverse to the direction of air flow.

10. An apparatus as in claim 7 in which the fluid cooling section includes packing capable of providing direct contact between air and a gravitating liquid fluid.

11. An apparatus as in claim 7 together with a recycle conduit for liquid to provide communication between said fluid cooling section fluid inlet and outlet openings, and heat exchange means associated with said recycle conduit for transmitting heat to fluid flowing therethrough.

12. An apparatus as in claim 7 in which said stripping section is of a counterflow type and said cooling section is of a crossflow type with a horizontally open gas outlet opening disposed to the side of and below said stripping section air inlet opening.

13. An apparatus as in claim 7 in which said cooling section and stripping sections are of a crossflow type with substantial portions disposed at the same elevation.

* * * * *